United States Patent
Rill et al.

(10) Patent No.: US 9,511,673 B2
(45) Date of Patent: Dec. 6, 2016

(54) HEATED CONNECTION FOR CHARGING ELECTRIC VEHICLES

(71) Applicant: Robert Bosch GmbH, Stuttgart (DE)

(72) Inventors: Viktor Rill, Korntal-Muenchingen (DE); Jochen Kilb, Sersheim (DE)

(73) Assignee: Robert Bosch GmbH, Stuttgart (DE)

( * ) Notice: Subject to any disclaimer, the term of this patent is extended or adjusted under 35 U.S.C. 154(b) by 126 days.

(21) Appl. No.: 14/400,395

(22) PCT Filed: Mar. 18, 2013

(86) PCT No.: PCT/EP2013/055555
§ 371 (c)(1),
(2) Date: Nov. 11, 2014

(87) PCT Pub. No.: WO2013/170980
PCT Pub. Date: Nov. 21, 2013

(65) Prior Publication Data
US 2015/0115889 A1    Apr. 30, 2015

(30) Foreign Application Priority Data
May 14, 2012 (DE) .......... 10 2012 208 005

(51) Int. Cl.
*B60L 11/18* (2006.01)
*B60L 1/02* (2006.01)
(Continued)

(52) U.S. Cl.
CPC ......... *B60L 11/1816* (2013.01); *B60L 1/02* (2013.01); *B60L 3/0069* (2013.01); *B60L 3/04* (2013.01);
(Continued)

(58) Field of Classification Search
CPC .............. B60L 11/1816; B60L 11/1818; B60L 2230/12;B60L 2240/662; B60L 1/02; B60L 3/0069; B60L 3/04; B60L 11/1825; B60L 2250/12; B60L 2240/36; B60L 2240/80; Y02T 10/7088; Y02T 10/7005; Y02T 90/128; Y02T 90/121; Y02T 90/14; Y02T 90/16; Y02T 10/7291; H02J 7/00; H01R 13/6608; H01R 13/701
See application file for complete search history.

(56) References Cited

U.S. PATENT DOCUMENTS 4,139,071 A * 2/1979 Tackett .................... B60K 1/00
                                                    180/165
4,730,097 A * 3/1988 Campbell ............... B60S 1/026
                                                    219/203
(Continued)

FOREIGN PATENT DOCUMENTS

DE    102010000268    8/2011
EP       1876510      1/2008
(Continued)

OTHER PUBLICATIONS

International Search Report for Application No. PCT/EP2013/055555 dated Jan. 3, 2014 (English Translation, 3 pages).

*Primary Examiner* — Naum B Levin
(74) *Attorney, Agent, or Firm* — Michael Best & Friedrich LLP

(57) ABSTRACT

Electrical connection arrangement (32) for a charging system (10), especially for charging a vehicle battery (14) of a motor vehicle (12), comprising a first connecting element (28) that can be connected to a charging station (20) and that can establish electrical charging contact with the second connecting element (30) which is supported on a mobile platform (12). At least one heating element (40) is integrated into the first connecting element and/or into the second connecting element.

14 Claims, 3 Drawing Sheets

(51) Int. Cl.
*B60L 3/00* (2006.01)
*B60L 3/04* (2006.01)
*H02J 7/00* (2006.01)
*H01R 13/66* (2006.01)
*H01R 13/70* (2006.01)

(52) U.S. Cl.
CPC ........ *B60L 11/1818* (2013.01); *B60L 11/1825* (2013.01); *B60L 2230/12* (2013.01); *B60L 2240/36* (2013.01); *B60L 2240/662* (2013.01); *B60L 2240/80* (2013.01); *B60L 2250/12* (2013.01); *H01R 13/6608* (2013.01); *H01R 13/701* (2013.01); *H02J 7/00* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01)

(56) References Cited

U.S. PATENT DOCUMENTS

| | | | | |
|---|---|---|---|---|
| 5,624,003 A * | 4/1997 | Matsuki | ............ | B60H 1/00278 180/65.1 |
| 5,803,216 A * | 9/1998 | McNaught | ......... | B60L 11/1816 191/12.4 |
| 6,098,992 A * | 8/2000 | Long | ....................... | B60J 10/00 277/637 |
| 6,179,654 B1 * | 1/2001 | Witkowski | ............... | B60L 1/06 439/550 |
| 7,991,273 B2 * | 8/2011 | Sonderegger | ............ | H05B 3/58 392/465 |
| 8,084,154 B2 * | 12/2011 | Scheucher | ................ | B60L 8/00 429/100 |
| 8,125,182 B2 * | 2/2012 | Hashim | ................ | B60L 11/005 320/104 |
| 8,247,123 B2 * | 8/2012 | Hirakata | .......... | H01M 8/04037 429/428 |
| 8,573,998 B2 * | 11/2013 | Ichio | ................... | B60L 11/1818 439/358 |
| 8,760,116 B2 * | 6/2014 | Fujii | ........................ | B60L 1/04 219/202 |
| 9,034,532 B2 * | 5/2015 | Sung | ................ | H01M 8/04037 429/429 |
| 9,178,369 B2 * | 11/2015 | Partovi | ................... | H02J 7/025 |
| 2006/0016793 A1 | 1/2006 | Zhu et al. | | |
| 2007/0212598 A1 | 9/2007 | Iida et al. | | |
| 2010/0231169 A1 * | 9/2010 | Hashim | ................ | B60L 11/005 320/134 |
| 2011/0025266 A1 * | 2/2011 | Li | ...................... | B60L 11/1818 320/109 |
| 2011/0199047 A1 | 8/2011 | Fujii | | |
| 2011/0246014 A1 * | 10/2011 | Sauper | ................ | B60L 11/1818 701/22 |

FOREIGN PATENT DOCUMENTS

| | | |
|---|---|---|
| JP | 2002044877 | 2/2002 |
| JP | 2010193618 | 9/2010 |
| WO | 2009012038 | 1/2009 |

* cited by examiner

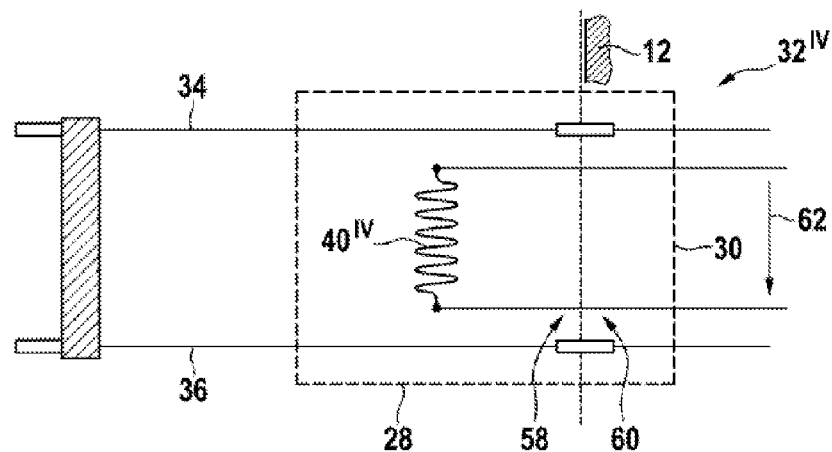
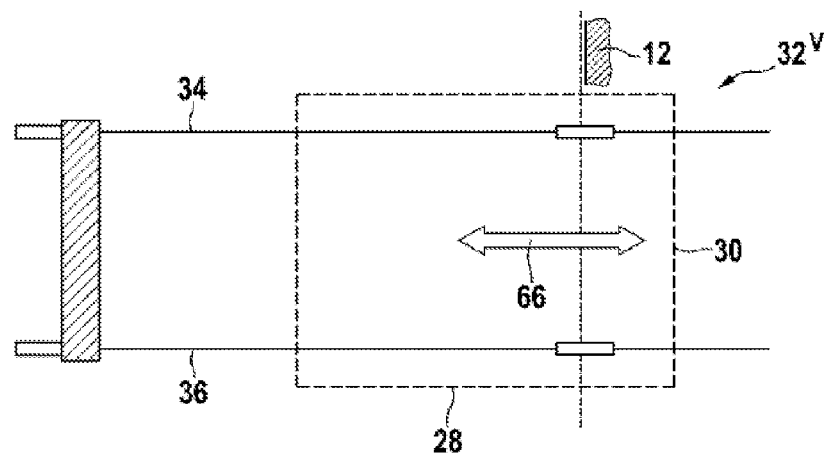

HEATED CONNECTION FOR CHARGING ELECTRIC VEHICLES

BACKGROUND OF THE INVENTION

The present invention relates to an electrical connection arrangement for a charging system, in particular for charging a vehicle battery of a motor vehicle, having a first connection element which can be connected to a charging station and which can come into electrical charging contact with a second connection element which is mounted on the mobile platform.

The present invention further relates to a charging system for a mobile platform, having a charging cable which is connected to a charging station at one end and which has an electrical first connection element at its other end, it being possible for said electrical first connection element to be connected to a corresponding second connection element of the mobile platform, and also relates to a method for operating an electrical connection element of a charging system for charging a battery of a mobile platform.

In the field of motor vehicles, it is known to use an electric drive unit to drive the motor vehicle. Examples of this are so-called hybrid vehicles and electric vehicles.

In both cases, it is possible to charge a vehicle battery which is carried along in the vehicle by means of a generator which is located onboard the motor vehicle. However, in general, the trend is toward charging the vehicle battery at a stationary charging station which has a charging device which is connected to an energy supply system (so-called "plug-in" hybrid).

A charging system which is used in this case generally contains a connection element which is connected to the charging station by means of a charging cable, wherein the connection element (for example a plug) is connected to a connection element of the motor vehicle (for example a socket on the vehicle body).

Charging processes of this kind should be performed in as simple a manner as possible and should also be possible in possibly adverse ambient conditions. Charging stations of this kind can also be erected, for example, in public where they are exposed to wind and weather.

Low temperatures are generally problematical during charging. This relates primarily to the battery itself. The battery should not fall below specific temperatures.

It is therefore known, for example from documents JP 2002 044 877 A, U.S. 2006/0016793 A1 and U.S. 2007/0212598 A1, to heat the vehicle battery by means of a heating device.

It is further known from document JP 2010-193618 A to connect a connection element of a charging system of this kind, said connection element being connected to a charging cable, to a connection element on the charging station, wherein electrical contact sections in the charging station connection element can be short-circuited. In the case of this charging system, provision is made for the electrical conductors of a charging cable to be connected not only to a charging device, but also to a DC power source. At low temperatures, the charging cable is electrically disconnected from the charging device and connected to the separate DC power source, and the charging station connection element is short-circuited. As a result, the charging cable can be heated overall, as a result of which the ability to handle said charging cable at low temperatures is improved. As soon as the connection element which is connected to the charging cable is disconnected from the charging station connection element, the charging cable can be electrically reconnected to the charging device in order to then be able to carry out a charging process of a vehicle battery—using a heated charging cable.

However, in general, there is a need, for improvement, for improved electrical connection arrangements, and also an improved charging system and an improved method for operating an electrical connection arrangement and, respectively, a charging system.

The reliability and/or the handleability, for example, should be improved in the process.

SUMMARY OF THE INVENTION

In the case of the electrical connection arrangement cited in the introductory part, the above object is achieved in that at least one heating element is integrated into the first connection element and/or into the second connection element.

The above object is further achieved by a charging system of the kind cited in the introductory part, wherein at least one heating element is integrated into the first and/or into the second connection element.

The above object is finally achieved by a method for heating an electrical connection element of a charging system for electrically charging a battery of a mobile platform, in particular using a connection arrangement according to the invention, comprising the step of activating a heating element which is integrated into the connection element.

Targeted heating of the connection element and, respectively, of the connection arrangement is possible by virtue of this measure. As a result, the connection arrangements may be prevented from freezing solid and simple release (thawing function) can always be possible.

There is furthermore an increase in comfort, for example owing to a pleasant temperature at the first connection element which is typically intended to be handled by hand, with the result that a charging process can also be carried out without gloves.

Since connection elements of electrical connection arrangements of this kind can frequently contain moving elements, such as locks or securing elements for example, the ability of said elements to move can be ensured by the ability of the connection element to be heated. Accordingly, connection of the connection elements and/or release of the connection elements from one another can also be ensured under unfavorable conditions (frost or snowfall). Furthermore, attempts to release the vehicle, connection arrangement and/or charging cable, possibly by force, can be prevented and consequently security risks are precluded.

Furthermore, the subjective safety of the user can be increased since freezing solid could suggest a safety risk to the user.

The first connection element can be designed in the manner of a plug and preferably has a housing and contact sections which are mounted in said housing and by means of which an electric charging current can be transmitted from a charging cable to the second connection element.

The heating element can be, for example, a fluidic heating element in which a heated fluid heats the connection element.

However, it is particularly preferred when the heating element is an electrical heating element.

In this case, the heating element can be realized, for example, by an electrical resistor, wherein the heating element generally has a higher electrical resistance than an electrical conductor of the charging cable or a contact section of the connection element.

In this case, the electrical heating element can be electrically connected to the charging station, in particular by means of a charging cable, in one embodiment.

In this embodiment, the contact element can be heated by means of energy which is supplied by means of the charging cable. In this case, a charging current, or a preset heating current, can be used, for example.

According to a further embodiment, the electrical heating element can be electrically connected to a heating contact arrangement which can be electrically connected to a corresponding heating contact arrangement of the second connection element in such a way that energy can be supplied to the heating element by means of an energy store of the mobile platform.

In this case, electrical energy can be supplied to the second and/or the first connection element, which is connected to a charging cable, by means of the heating contact arrangements.

As an alternative or in addition, electrical energy from the platform battery can be supplied to the connection element of the mobile platform (vehicle).

According to one embodiment, at least one electrical heating element is integrated in series into an electrical contact section of the first and/or of the second connection element.

In this embodiment, the heating element is heated by a current which is also carried, for example, by means of the charging cable.

In this embodiment, the connection element can be automatically heated during charging. The heating element can be, for example, an integrated resistor, a deliberate taper in the cable, the provision of a plurality of line turns in the contact section etc.

During operation of a connection element of this kind, it is preferred when a charging current flows before the desired decoupling/disconnection of the connection, it being possible to achieve this, for example, by a suitable charging control means.

According to a further preferred embodiment, at least one electrical heating element is integrated into a branch which is connected in parallel to two contact sections of the first and/or of the second connection element.

When a heating element is incorporated into a parallel branch, it is possible, in an electrically and/or structurally simple manner, to separate the heating function from the charging function.

Furthermore, a suitable resistance value can possibly result in a suitable heating current flowing across the heating element at a preset charging voltage.

According to one variant, an electrical frequency filter is integrated into the branch between the electrical contact sections.

Said electrical frequency filter is preferably connected in series with the electrical heating element in the parallel branch.

As a result, a high-frequency alternating heating current can be superimposed on a DC charging voltage on the charging cable, it being possible for said high-frequency alternating heating current to be filtered out at the vehicle battery sides but to flow through the electrical frequency filter into the parallel branch.

In this case, the frequency filter can contain, for example, an LC or an RLC circuit which is tuned to a frequency which corresponds to the frequency of the superimposed alternating heating voltage.

According to a further preferred embodiment, a switch for activating and/or for deactivating the heating element is integrated into the branch between the electrical contact sections of the first and/or of the second connection element.

In this embodiment, a charging process can be carried out when the heating element is deactivated, as if no heating element were present. In the event of activation, a heating operation of the connection element can be carried out before a charging process and/or during a charging process and/or after a charging process, before driving is started.

In this case, it is advantageous according to one embodiment when the switch has a momentary contact switch which can be manually operated.

A momentary contact switch of this kind can be operated, for example, by an operator, as a result of which the connection element can then be heated relatively rapidly. In this case, it is advantageous that an existing power supply (for example a 230 V supply system) can be used.

By way of example, an on-board vehicle electrical system can optionally be used in this variant too.

According to a further preferred embodiment, the switch can be designed such that it can be operated by means of a trigger signal.

The trigger signal can be, for example, a signal which is transmitted by radio, but can also be a signal which arrives from the mobile platform via a signal line or from the charging station via a signal line.

The trigger signal can allow, for example, automatic activation of the heating element. This can be performed, for example, by means of a timer, by means of a temperature switch, by means of a battery management system, by means of a battery heater or some other vehicle control means.

The heating element can be provided both on the platform-side connection element or else on the charging station-side connection element (or on both).

It goes without saying that the abovementioned features and those still to be explained below can be used not only in the respectively specified combination, but also in other combinations or on their own, without departing from the scope of the present invention.

BRIEF DESCRIPTION OF THE DRAWINGS

Exemplary embodiments of the invention are illustrated in the drawing and will be explained in greater detail in the following description. In the drawing:

FIG. 5 is a schematic illustration of a further embodiment of a connection arrangement according to the invention; and FIG. 6 is a schematic illustration of a further embodiment of a connection arrangement according to the invention.

DETAILED DESCRIPTION

Figure 1:
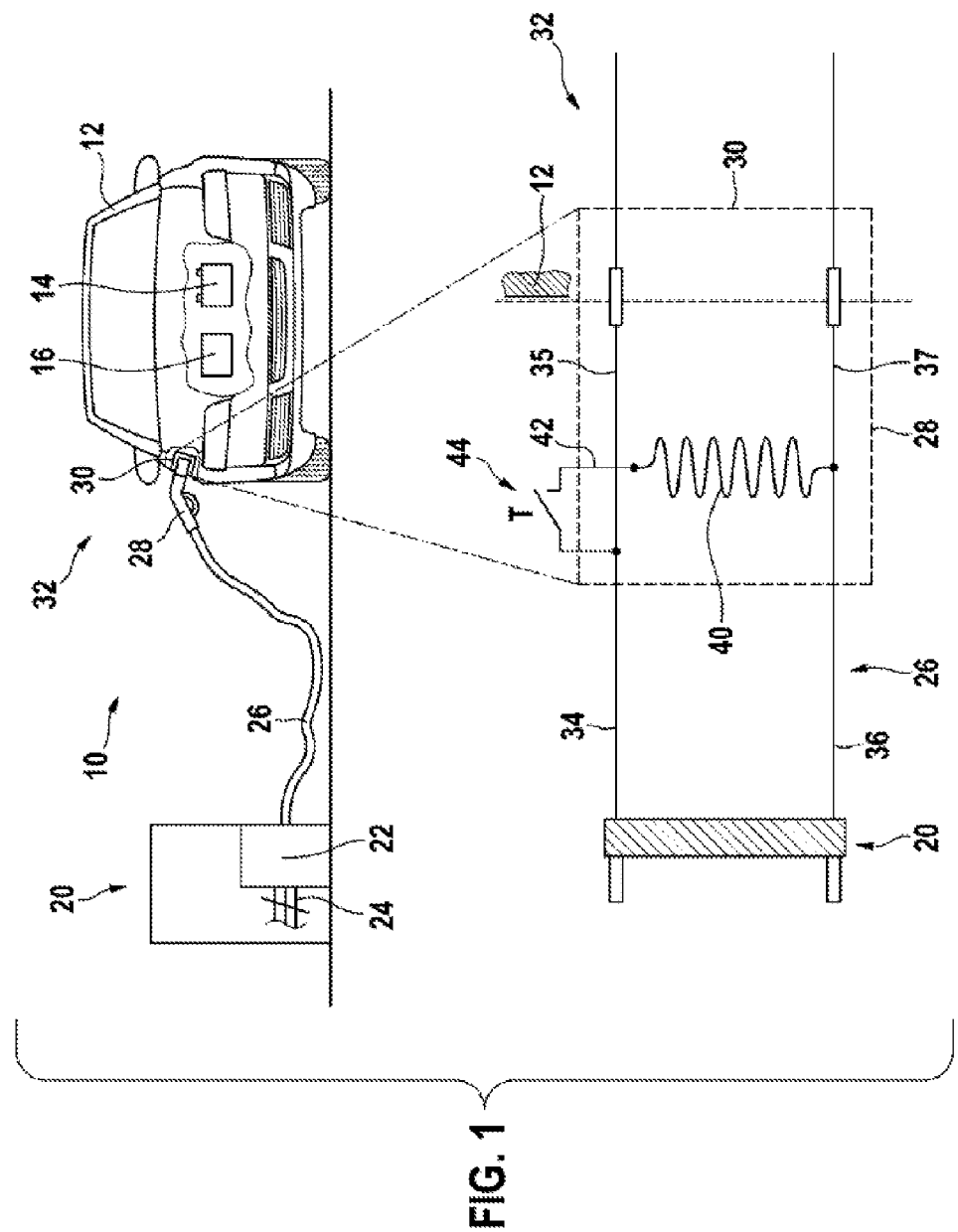
FIG. 1 is a schematic illustration of an embodiment of a charging system according to the invention having a connection arrangement according to the invention.

FIG. 1 schematically shows a charging system 10 for a mobile platform in the form of a motor vehicle 12. The motor vehicle 12 has a battery 14 and an electrical drive unit 16. A drive train which can be realized by said electrical drive unit can be designed as a hybrid drive train or as an electrical drive train. In either case, the battery 14 can be charged by means of a charging station 20. The charging station 20, which can also be provided outdoors in public areas or private areas, contains a charging device 22 which is connected to a power supply system (for example 230 V supply system or 400 V supply system). The charging device 22 provides a charging voltage and feeds said charging voltage into a charging cable 26, a first connection element 28 (for example in the form of a charging plug) being formed at the free end of said charging cable.

A second connection element 30 (for example in the form of a socket) is formed on the motor vehicle. In order to initiate a charging process, the connection elements 28, 30 can be connected to one another, for example a charging plug can be inserted into a charging socket.

The connection elements 28, 30 form an electrical connection arrangement 32 for the charging system 10.

The charging cable 26 has at least one first electrical conductor 34 and at least one second electrical conductor 36. The conductors 34, 36 are connected to electrical contact sections 35, 37 of the connection element 28. In this case, the contact sections can be designed as rigid or as flexible conductor sections within the connection element 28.

In a corresponding manner, the connection element 30 can contain contact sections of this kind When carrying out a charging process, a charging current flows by means of the electrical conductors 34, 36 into the electrical contact sections 35, 37, and from there into corresponding contact sections of the vehicle-side connection element 30. The contact sections of the vehicle-side connection element 30 are connected to the vehicle battery 14, so that a charging process of the vehicle battery 14 of the motor vehicle 12 can be carried out by means of the stationary charging station 20.

In the present case, a heating element 40 in the form of an electrical heating resistor is integrated in a parallel branch 42 between the electrical contact sections 35, 37 of the first connection element 28. A switch 44 in the form of a momentary contact switch T or the like is arranged in series with the heating element 40 in the parallel branch 42. When the switch 44 is open, a charging process can take place, as if no heating device were present. When the switch 44 is closed, an electric current flows across the parallel branch 42, this leading to heating of the electrical heating element 40. The connection element 28 can be heated as a result.

The following FIGS. 2 to 6 describe further embodiments of electrical connection arrangements which, in general, correspond to the connection arrangement 32 of FIG. 1 in respect of structure and manner of operation. Identical elements are therefore identified by the same reference symbols. The differences are substantially explained in the text which follows.

Figure 2:
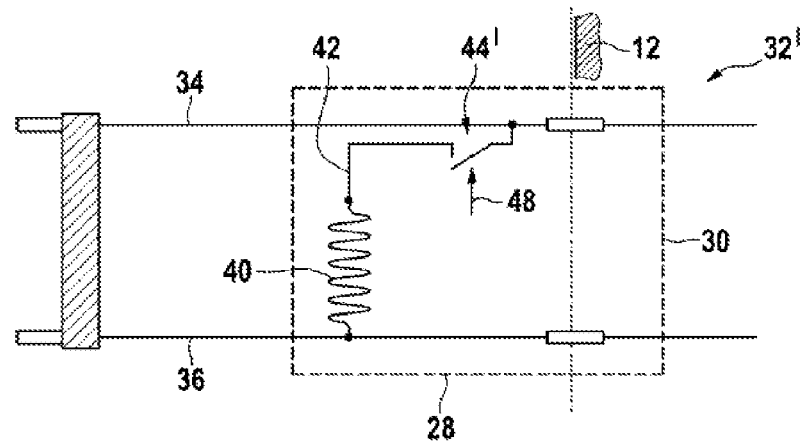
FIG. 2 is a schematic illustration of a further embodiment of a connection arrangement according to the invention.

In the case of the connection arrangement $32^I$ which is shown in FIG. 2, a switch $44^I$ is provided in the parallel branch 42, it being possible for said switch to be operated by means of a trigger signal 48. The trigger signal 48 can be, for example, a radio signal, in which case the switch $44^I$ contains a suitable radio reception device.

As an alternative, the trigger signal 48 can also be supplied via an electrical signal line.

The heating element 40 can be activated in an automated manner as required by means of the trigger signal 48, for example by means of a timer, by means of a temperature switch, by means of a battery management system of the battery 14, by means of a battery heating device of the battery 14 and/or by means of some other vehicle control means.

Figure 3:
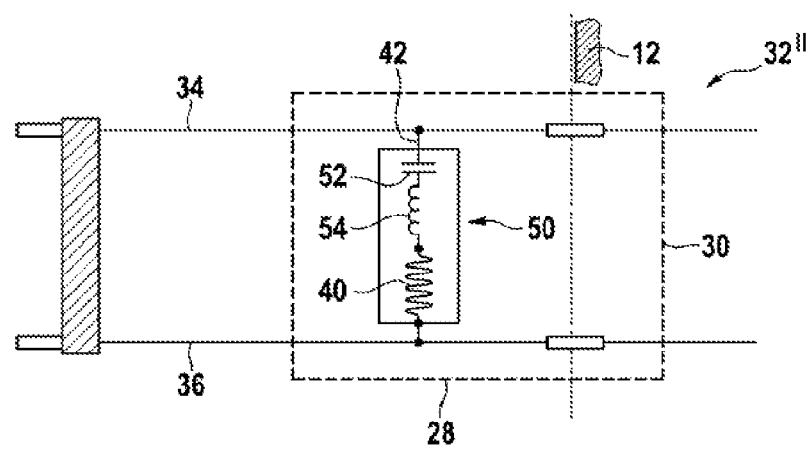
FIG. 3 is a schematic illustration of a further embodiment of a connection arrangement according to the invention.

In the case of the connection arrangement $32^{II}$ which is shown in FIG. 3, a frequency filter 50 is connected into the parallel branch 42 in series with the heating element 40. In the present case, the frequency filter 50 has a capacitor 52 and also a coil 54 which is connected in series with said capacitor.

The filter frequency 50 is preferably tuned to a specific heating frequency which can correspond to the frequency of an alternating heating current which can be superimposed on a DC charging current in the electrical conductors 34, 36 of the charging cable.

Particularly when the charging current is a DC current, the frequency filter 50 contains a capacitor in the parallel branch 42, with the result that a charging current can be prevented from flowing in the parallel branch 42.

Figure 4:
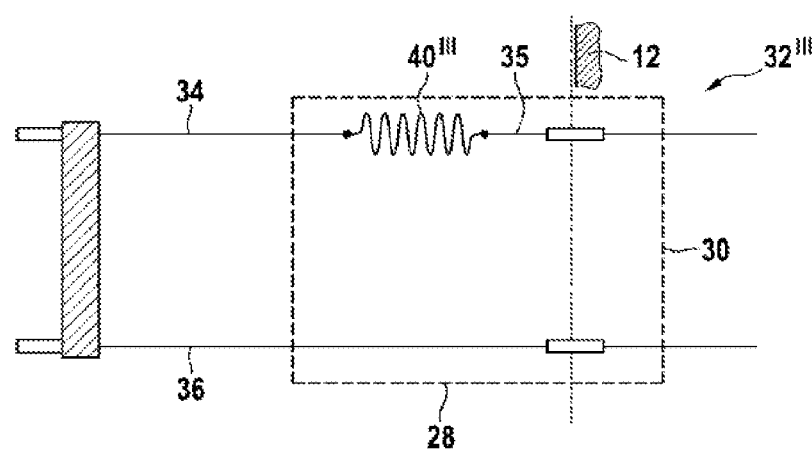
FIG. 4 is a schematic illustration of a further embodiment of a connection arrangement according to the invention.

In the case of the embodiment of a connection arrangement $32^{III}$ which is shown in FIG. 4, a heating element $40^{III}$ is integrated in series into the electrical contact section 35 of the connection element 28. Accordingly, whenever a charging current flows, said charging current also flows across the heating element $40^{III}$ and heats said heating element and consequently the connection element 28.

In the case of the connection arrangement $32^{IV}$ which is shown in FIG. 5, an electrical heating element $40^{IV}$ is once again provided in the connection element 28, but said electrical heating element is not connected to the contact sections 35, 37 in the present case, but rather to an electrical heating contact arrangement 58 which is provided in parallel to said contact sections. The second connection element 30 contains a corresponding electrical heating contact arrangement 60 to which a heating voltage 62 can be provided on the vehicle side, said heating voltage being fed, for example, from the battery 14.

FIG. 6 finally shows, in schematic form, that the arrangement of the heating elements in the various variants illustrated above can be interchanged between the first connection element 28 and the second connection element 30, as is schematically illustrated by an arrow 66.

What is claimed is:

1. An electrical connection arrangement (32) for a charging system (10), having a first connection element (28) configured to be connected to a charging station (20) and which is configured to come into electrical charging contact with a second connection element (30) which is mounted on a mobile platform (12),
characterized in that
at least one heating element (40) is integrated into a branch (42) which is connected in parallel to two electrical contact sections of at least one of the first connection element (28) and the second connection element (30), wherein a frequency filter (50) is integrated into the branch (42) between the two electrical contact sections and is tuned to a specific heating frequency corresponding to a frequency of an alternating heating current superimposed on a charging current in a charging cable (26).

2. The electrical connection arrangement as claimed in claim 1, characterized in that the heating element is an electrical heating element (40).

3. The electrical connection arrangement as claimed in claim 2, characterized in that the electrical heating element (40) is configured to be electrically connected to the charging station (20).

4. The electrical connection arrangement as claimed in claim 2, characterized in that the electrical heating element (40) is configured to be electrically connected to a heating contact arrangement which is configured to be electrically connected to a corresponding heating contact arrangement of the second connection element (28) in such a way that energy is supplied to the heating element (40) by an energy store of the mobile platform (12).

5. The electrical connection arrangement as claimed in claim 2, characterized in that the electrical heating element (40) is configured to be electrically connected to the charging station (20) by the charging cable (26).

6. The electrical connection arrangement as claimed in claim 1, characterized in that the heating element is integrated into the first connection element.

7. The electrical connection arrangement as claimed in claim 1, characterized in that the heating element is integrated into the second connection element.

8. A method for heating an electrical connection element (28, 30) of a charging system (10) for electrically charging a battery (14) of a mobile platform (12) using an electrical connection arrangement (32) as claimed in claim 1, comprising the step of activating a heating element (40) which is integrated into the connection element (28, 30).

9. The electrical connection arrangement as claimed in claim 1, wherein the frequency filter (50) includes a capacitor (52) and a coil (54) connected in series.

10. The electrical connection arrangement as claimed in claim 1, wherein the frequency filter (50) includes a capacitor (52) in the branch (42) configured to prevent a charging current from flowing in the branch (42) when charging with a DC current.

11. A charging system (10) for a mobile platform (12), having a charging cable (26) which is connected to a charging station (20) at one end and which has an electrical first connection element (28) at an other end, said electrical first connection element being configured to be connected to a corresponding second connection element (30) of the mobile platform (12), wherein at least one heating element (40) is integrated into a branch (42) which is connected in parallel to two electrical contact sections of at least one of the first connection element (28) and the second connection element (30), wherein a frequency filter (50) is integrated into the branch (42) between the two electrical contact sections and is tuned to a specific heating frequency corresponding to a frequency of an alternating heating current superimposed on a charging current in the charging cable (26).

12. The charging system as claimed in claim 11, wherein the frequency filter (50) includes a capacitor (52) and a coil (54) connected in series.

13. The charging system as claimed in claim 11, wherein the frequency filter (50) includes a capacitor (52) in the branch (42) configured to prevent a charging current from flowing in the branch (42) when charging with a DC current.

14. A method for heating an electrical connection element (28, 30) of a charging system (10) for electrically charging a battery (14) of a mobile platform (12), comprising the step of activating a heating element (40) which is integrated into a branch (42) which is connected in parallel to two electrical contact sections of at least one of the first connection element (28) and the second connection element (30), wherein a frequency filter (50) is integrated into the branch (42) between the two electrical contact sections and is tuned to a specific heating frequency corresponding to a frequency of an alternating heating current superimposed on a charging current in a charging cable (26).

\* \* \* \* \*